United States Patent
Mecsaci

(10) Patent No.: US 11,523,616 B2
(45) Date of Patent: Dec. 13, 2022

(54) FOLDING PIZZA PEEL

(71) Applicant: Ahmad Mecsaci, Germering (DE)

(72) Inventor: Ahmad Mecsaci, Germering (DE)

( * ) Notice: Subject to any disclaimer, the term of this patent is extended or adjusted under 35 U.S.C. 154(b) by 50 days.

(21) Appl. No.: 17/301,998

(22) Filed: Apr. 21, 2021

(65) Prior Publication Data

US 2022/0079169 A1   Mar. 17, 2022

Related U.S. Application Data

(60) Provisional application No. 62/706,852, filed on Sep. 14, 2020.

(51) Int. Cl.
 *A21B 3/00* (2006.01)
 *A47J 43/28* (2006.01)

(52) U.S. Cl.
 CPC ............ *A21B 3/003* (2013.01); *A47J 43/288* (2013.01)

(58) Field of Classification Search
 CPC ........ A21B 3/003; A47J 43/288; A47J 37/108
 USPC ................................ 294/7, 8, 53.5
 See application file for complete search history.

(56) References Cited

U.S. PATENT DOCUMENTS

| | | |
|---|---|---|
| 1,906,281 A | 5/1933 | Schroeder |
| 2,063,432 A | 12/1936 | Greene |
| 2,830,307 A * | 4/1958 | Worden ................. A01B 1/022 294/51 |
| 3,401,971 A * | 9/1968 | Cronquist ............... A01B 1/022 294/53.5 |
| 4,823,419 A | 4/1989 | Stimpson |
| 5,104,166 A | 4/1992 | Corsaro et al. |
| 5,105,493 A * | 4/1992 | Lugtenaar ............... A01D 11/00 7/116 |
| 5,716,086 A | 2/1998 | Bifulco |
| 5,810,408 A * | 9/1998 | Armstrong ............... B25G 1/06 294/51 |
| 6,065,394 A | 5/2000 | Gelderman |
| 6,068,313 A | 5/2000 | Casper et al. |
| 6,530,611 B2 | 3/2003 | Moreth |
| 6,746,062 B2 | 6/2004 | Bielecki et al. |
| 7,156,434 B2 | 1/2007 | Upton |
| 7,607,706 B2 | 10/2009 | Cunningham et al. |
| 7,934,755 B2 | 5/2011 | Missakian |
| 8,469,419 B2 | 6/2013 | Chapin |
| 8,778,435 B2 | 7/2014 | Pokotylo |
| 9,285,076 B2 * | 3/2016 | Paolucci ............. E04H 12/2215 |
| 10,602,745 B2 | 3/2020 | Goddard |

(Continued)

OTHER PUBLICATIONS

Swiss Link Military Surplus, German Army Issue Tri-Fold NATO Shovels | Hand Entrenching Tool, Web page: <https://www.youtube.com/watch?v=NE5aqRo8Vml >, Oct. 29, 2019.

*Primary Examiner* — Paul T Chin
(74) *Attorney, Agent, or Firm* — Dunlap Bennett & Ludwig, PLLC

(57) ABSTRACT

A pizza peel features a blade, a support bracket, a hinge, a nut and a handle. The support bracket is connected to the blade. The hinge is pivotally connected to the support bracket via a pin. The nut is assembled to the hinge outer threads. The handle is screwed in the hinge inner threads. The handle may be pivoted between a storage position and a deployed position and may be locked in the selected position by clockwise rotation of the nut. When the handle is in the stored position, the pizza peel may be easily stored.

11 Claims, 6 Drawing Sheets

(56) References Cited

U.S. PATENT DOCUMENTS

| | | | |
|---|---|---|---|
| 2002/0184713 A1* | 12/2002 | Dallas | A01B 1/022 7/116 |
| 2004/0156963 A1 | 8/2004 | Amoroso | |
| 2006/0130336 A1* | 6/2006 | Christensen | B26B 11/00 30/142 |
| 2007/0145757 A1* | 6/2007 | Wu | A01B 1/026 294/58 |

* cited by examiner

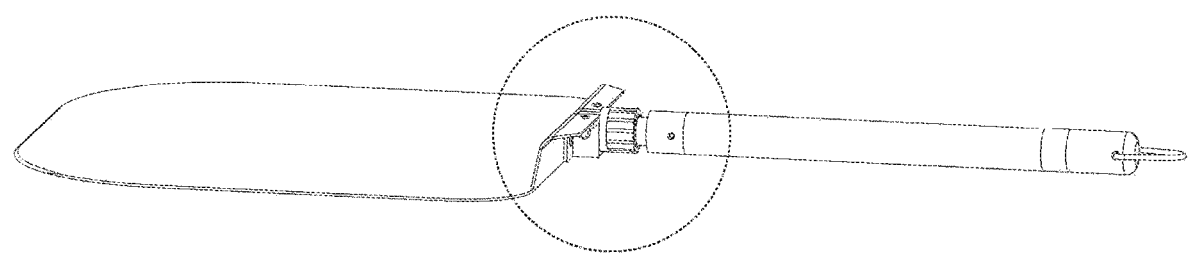
Fig. 7
Fig. 8(a)
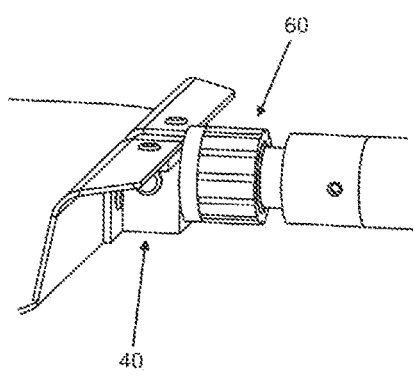
Fig. 8(b)
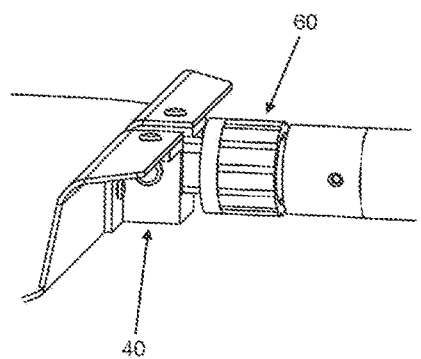

FOLDING PIZZA PEEL

CROSS-REFERENCE TO RELATED APPLICATION

This application claims the benefit of priority of U.S. provisional application No. 62/706,852, filed Sep. 14, 2020, the contents of which are herein incorporated by reference.

BACKGROUND OF THE INVENTION

The present invention relates generally to pizza peels of the type used to place pizza dough directly onto a flaming hot surface, like a grill or a pizza stone, and retrieve it when finished cooking, and more particularly, to a pizza peel with a handle that can be folded or collapsed for ease of storage.

Pizza peels used at pizza restaurants have long been known in the art. The basic design of a pizza peel includes a peel blade, usually made of metal, attached to a handle, usually made of wood to provide insulation. Pizza cooks use the peel blade to transfer the uncooked pizza into the pizza oven deeper than they would be able to by use of only their hands. Also, the pizza peel allows pizza cooks to transfer the pizza to the oven without losing the shape of the pizza, whether it be round or square, which is an issue due to the flimsy nature of an uncooked pizza dough. The pizza peel can be also used, during cooking, to rotate or displace the pizza and to retrieve it when finished cooking.

Pizza peels have traditionally been used in restaurants where storage of such cooking tools is not a significant issue. There has been an increasing interest among consumers, however, in performing restaurant style cooking at home, especially by using a pizza stone. With more pizza peels being used in the home, storage has become an issue because a home kitchen almost always has less storage space than a restaurant kitchen.

As a result, a need exists for a pizza peel that can be easily stored away. Furthermore, it would be desirable for a pizza peel to have a handle that is collapsible or foldable without the need of entirely removing the handle, thereby having the benefit of both a handle and storability. In addition to the collapsible functionality, the possibility of detaching the wooden handle for the purpose of cleaning the metal blade in the dishwasher is an advantage.

The new designed folding mechanism, as embodied in the present invention described herein, has an advantage (among others as described herein) in comparison to the prior art because it requires a short blade mounting portion, which means less storage space is required and/or more effective blade surface is permitted, and because it includes a sturdy and user-friendly locking mechanism in the deployed or storage position.

SUMMARY OF THE INVENTION

In one aspect of the present invention, a peel comprises a handle including a screw mounting end and a grip end, the handle defining a handle longitudinal axis that extends from the screw mounting end to the grip end. The peel further comprises a blade including a blade mounting portion attached to a blade edge, the blade edge defining a substantially planar surface, and the blade edge being configured to support a pizza or other baked good. The peel further comprises a support bracket coupled to the blade mounting portion. The peel further comprises a pin coupled to the support bracket. The peel further comprises a hinge rotatable around the pin. The hinge includes: a hinge inner thread at a first end of the hinge and along a hinge longitudinal axis, with the hinge inner thread selectively coupling with the screw mounting end of the handle, and a hinge outer thread along the hinge longitudinal axis. The peel further comprises a nut including a nut inner thread which fits to the hinge outer thread. Advantageously, the handle of the peel is configured to rotate approximately 180 degrees between a deployed position wherein the grip end extends away from the blade edge, and a storage position wherein the grip end is adjacent to the blade edge.

These and other features, aspects and advantages of the present invention will become better understood with reference to the following drawings, description and claims.

BRIEF DESCRIPTION OF THE DRAWINGS

FIG. 7 is a top side perspective view of the folding pizza peel of the present invention, with the handle in a deployed position;

FIG. 8(a) is a detail part view, taken from the dashed circled area of FIG. 7, of a mechanism part of the folding pizza peel of the present invention, shown with the nut in a tightened position;

FIG. 8(b) is a detail part view, taken from the dashed circled area of FIG. 7 and similar to FIG. 8(a), of the mechanism part of the folding pizza peel of the present invention, shown with the nut in a loosened position;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
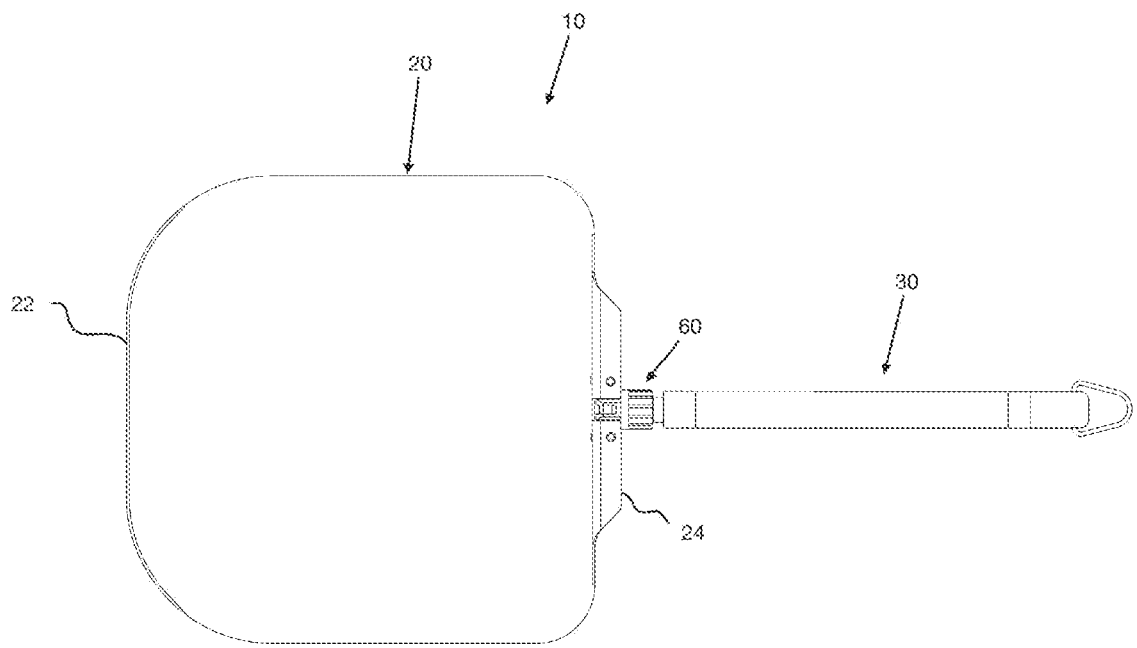
FIG. 1 is a top plan view an embodiment of the folding pizza peel of the present invention with the handle in the deployed position.
Figure 2:
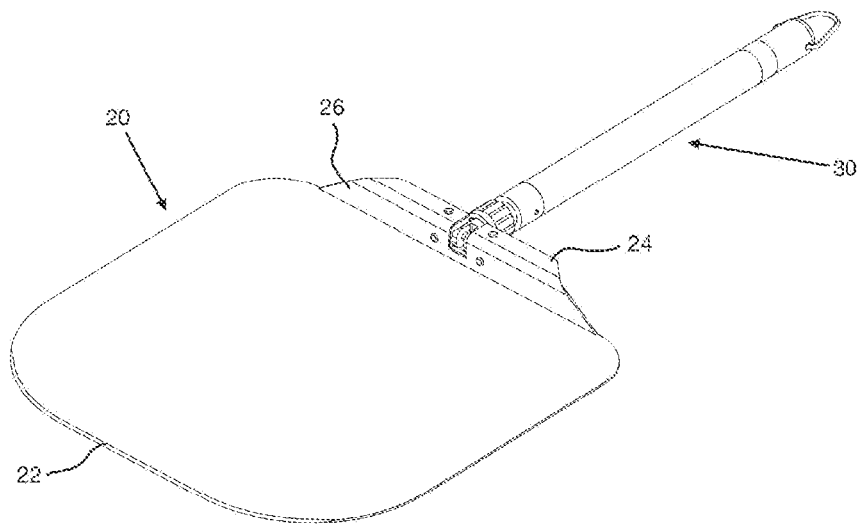
FIG. 2 is a top front (from blade aspect) perspective view of the folding pizza peel of the present invention.

An embodiment of the folding pizza peel of the present invention is indicated in general at 10 in FIG. 1. The pizza peel 10 includes a blade, indicated in general at 20, a handle, indicated in general at 30, and a nut, indicated in general at 60. As illustrated in FIGS. 1 and 2, the blade 20 includes a blade edge 22 and a mounting portion 24 and bent portion 26, as well as a substantially planar main body portion generally defined by the blade edge 22 and connected to the bent portion 26 for transferring/moving food, as described in greater detail below.

FIG. 1 illustrates the handle 30 in a deployed position. In the deployed position, the pizza peel 10 may be used to transfer the non-cooked pizza into an oven or onto any flaming hot surface, like a grill or a pizza stone. In this position, it may also be used shift the pizza and retrieve it from the oven or flaming hot surface. As will be described in greater detail below, the handle 30 may be pivoted with respect to the blade 20 so that the pizza peel 10 may be stored neatly in a compact storage configuration. While the embodiment of the present invention described is done so in terms of use for baking pizzas, it is, of course, understood that it could be sized and used to prepare other types of baked goods.

Figure 3:
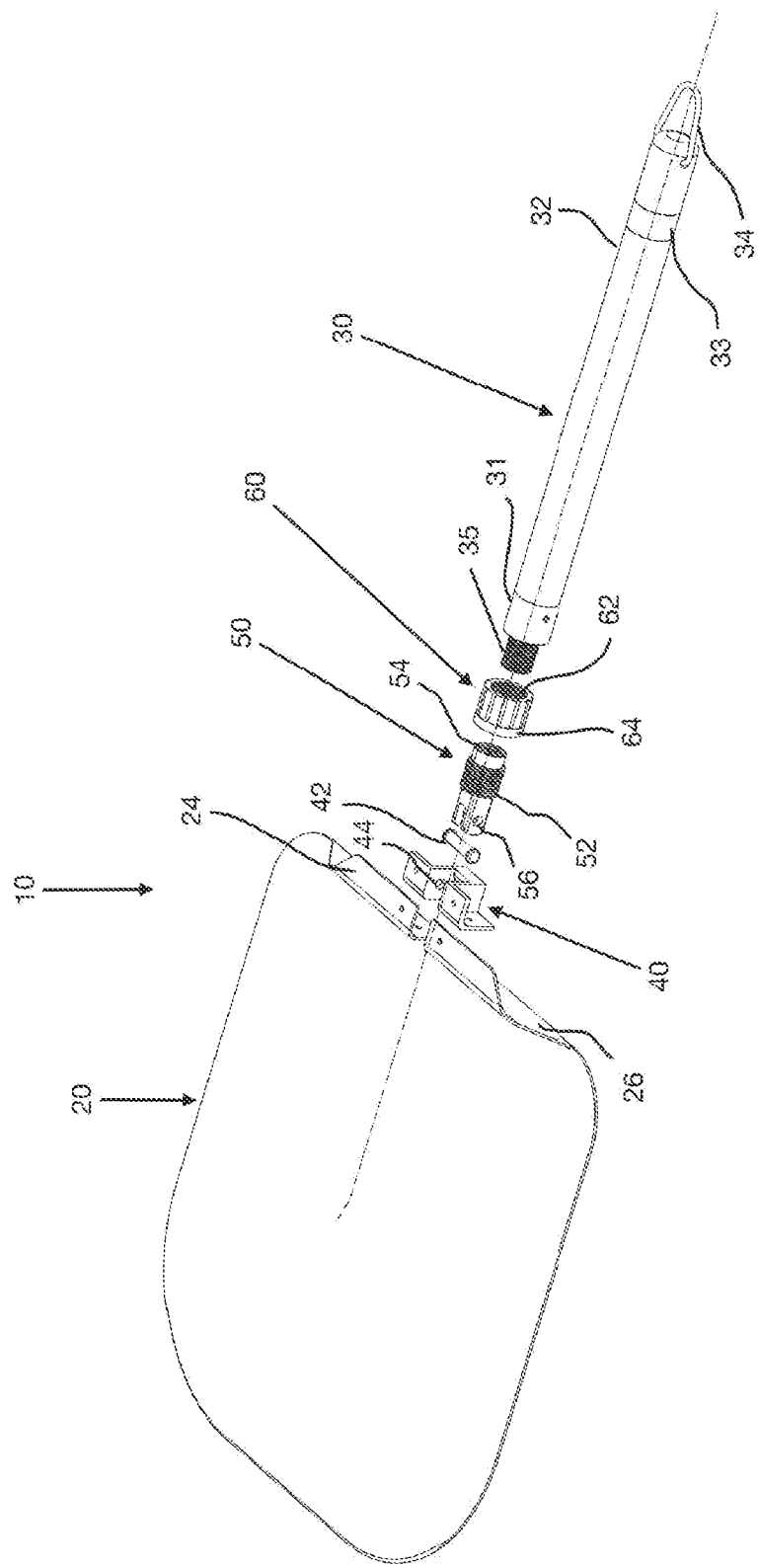
FIG. 3 is an exploded view from top side perspective of main parts of the folding pizza peel of the present invention.

FIG. 3 illustrates the various main parts of the folding and locking mechanism used in the pizza peel 10. The pizza peel 10 comprises a support bracket 40 generally connected to the blade mounting portion 24 and the bent portion 26 via rivets or other joint elements. The main functions of the support bracket 40 are to increase the stiffness of the pizza peel 10 and to bear a hinge 50. The connection of the support bracket 40 with the hinge 50 is generally realized using a metal pin 42, which passes through support holes 44 and hinge holes 56. With this configuration, hinge 50 can rotate about the axis passing through the pin 42.

As also illustrated in FIG. 3, the hinge 50 features also two threads, with one external thread 52 and one internal thread 54. Relative to the orientation shown in FIG. 3, the next part to the right of the hinge 50 is a nut 60. The nut 60 features an internal thread 62 which fits to the external thread 52 of the hinge 50 and a cap 64 made of, for example, heat resistant nylon. Other heat resistant and anti-scratch material may be also used. The function of the cap 64 is to protect the blade 20 and support bracket 40 from scratches due to friction between those parts when the nut 60 is tightened (e.g., FIG. 11).

Again, relative to the orientation shown in FIG. 3, the next part to the right of the nut 60 is the handle 30 with a blade mounting end 31 (which may be a socket made from metal, also referred to as a screw mounting end) and a grip end 32 is illustrated. The handle 30 may be equipped with a decor ring 33, a metal hanging loop 34 and a metal socket with an external thread 35 which fits into the internal thread 54 of the hinge 50 via a threaded coupling. This configuration allows the handle 30 to be selectively detached from the rest of the pizza peel 10, as needed. Alternatively, instead of metal socket, an external thread 35 may be directly cut in the wood handle at the mounting end 31.

Figure 4:
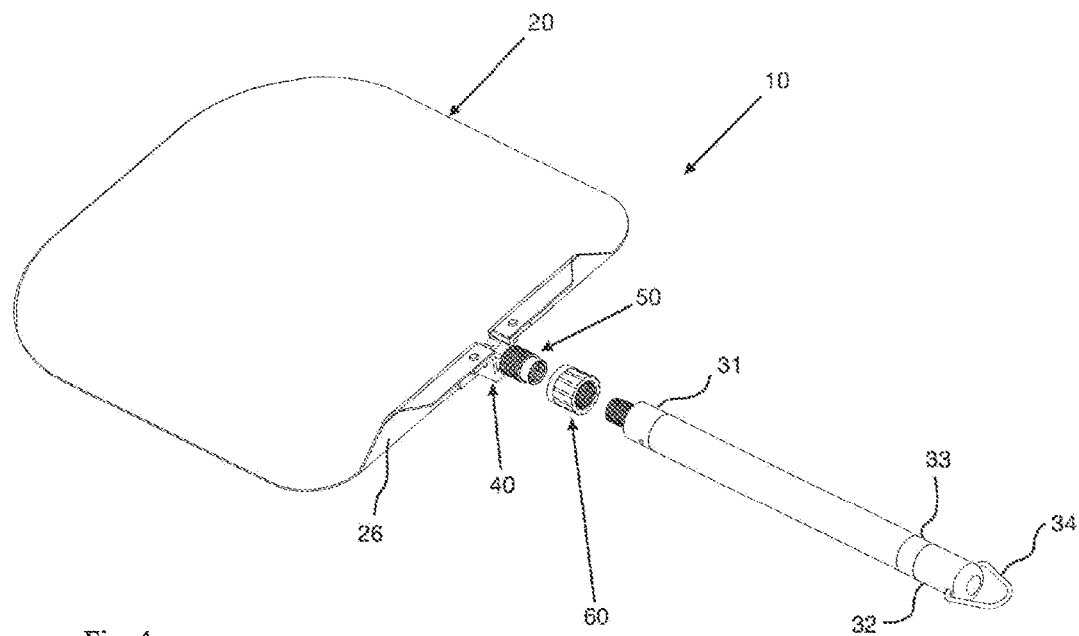
FIG. 4 is an exploded view from top back (from handle aspect) perspective of the main parts of the folding pizza peel of the present invention, the main parts capable of being disassembled and assembled by the user.
Figure 5:
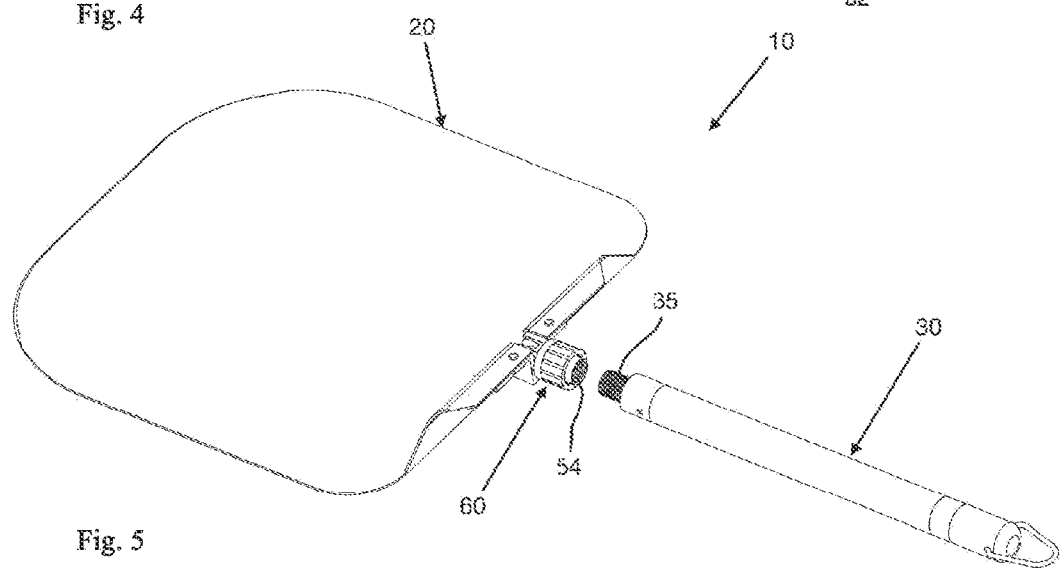
FIG. 5 is an exploded view from the top back perspective of the folding pizza peel of the present invention, similar to FIG. 4, where the nut is assembled on the peel blade.
Figure 6:
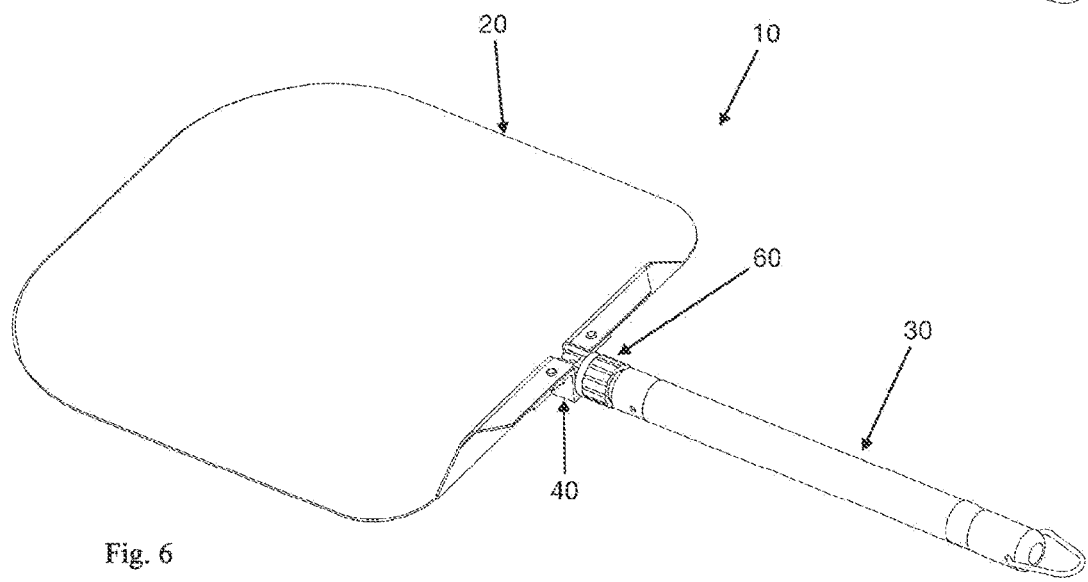
FIG. 6 is an exploded view from top back perspective of the folding pizza peel of the present invention, similar to FIG. 4, where the nut and handle are assembled on the peel blade.

FIGS. 4-6 generally illustrate the progression from disassembly to assembly of the pizza peel 10. FIG. 4 illustrates the dismountable (i.e., detachable) parts of the pizza peel 10 after manufacturing, which are the blade 20, the handle 30 and the nut 60. It is in general needed for offering the possibility to put only the metal blade 20 in the dishwasher without the wood handle 30, which may not be dishwasher safe. FIG. 5 illustrates the nut 60 assembled (i.e., threaded on the external thread 52 of the hinge 50, as described above) on the hinge 50 (not visible in FIG. 5, with the exception of the internal thread 54). FIG. 6 illustrates the completely assembled pizza peel 10, with the handle 30 coupled to the hinge 50.

FIG. 7 is a top perspective view of the pizza peel 10 in the deployed position. When the nut 60 is tightened with respect to the support bracket 40, the handle 30 is locked in the deployed position, as illustrated in FIG. 8(a). In this configuration, the rotation freedom of the handle 30 is blocked (due to the engagement of the cap 64 and the hinge 40) and the result is a stiff pizza peel 10 in the deployed position and ready to be operated/used by a user.

Figure 9:
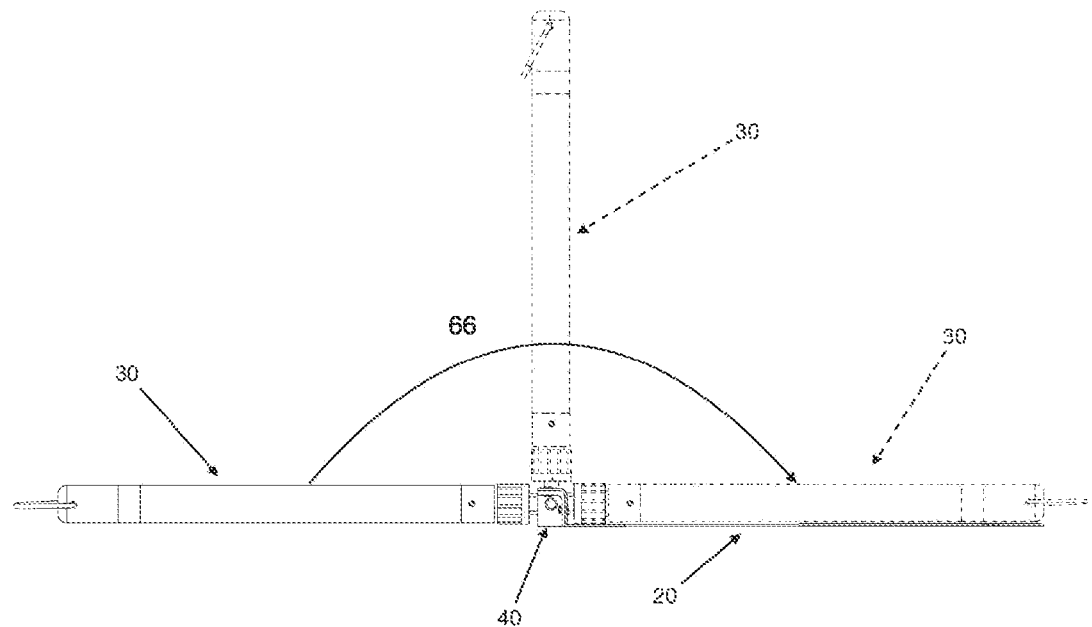
FIG. 9 is a side perspective view of the folding pizza peel of the present invention, with the handle in the deployed position illustrated in solid lines and with the handle storage position illustrated in phantom lines, as well as the transition from the deployed position to the storage position being illustrated by the clockwise arrow and the vertically oriented handle shown in phantom lines.
Figure 10:
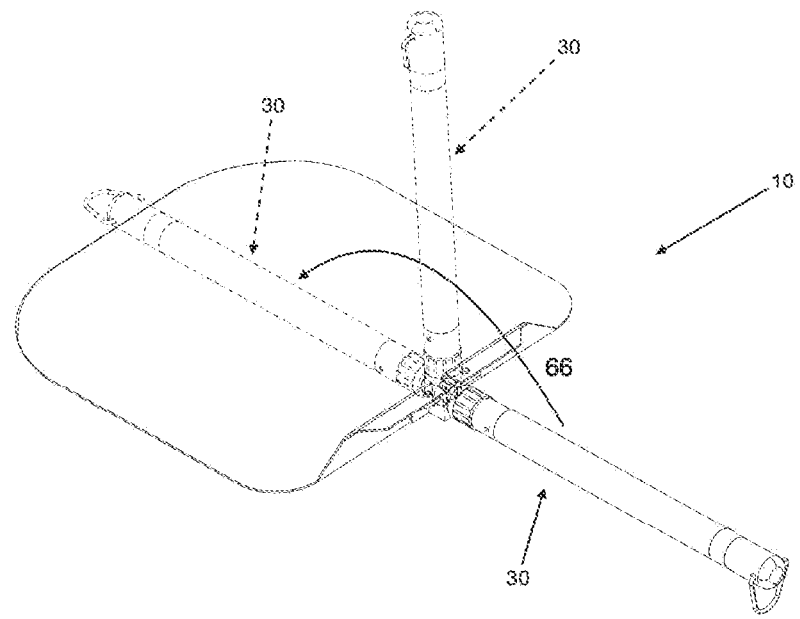
FIG. 10 is a top back perspective view of the folding pizza peel of the present invention, with the handle in the deployed position illustrated in solid lines, and with the handle storage position and transition thereto illustrated in phantom lines, with a curved arrow denoting the transition to the storage position.

With simple steps, due to the unique configuration, the pizza peel 10 can be transformed to a compact dimension for easy storage. To place the handle 30 in a storage position, the nut must be loosened first by rotating it counterclockwise, as illustrated in FIG. 8(b). The handle 30 can then be, as indicated by arrow 66 in FIG. 9 and FIG. 10, pivoted approximately 180 degrees around the pin 42 axis and in a perpendicular plane to the metal blade 20 to the storage position indicated in phantom.

Figure 11:
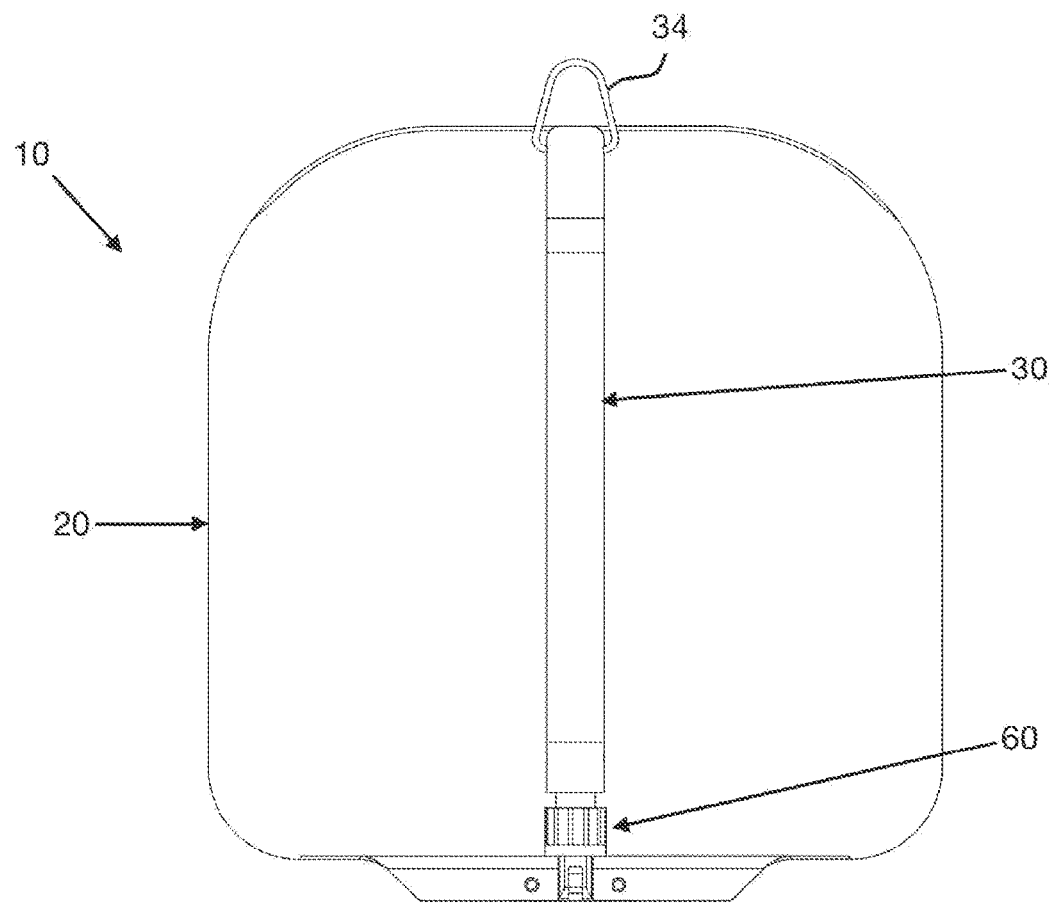
FIG. 11 is a top plan view of the folding pizza peel of the present invention with the handle in the storage position.
Figure 12A:
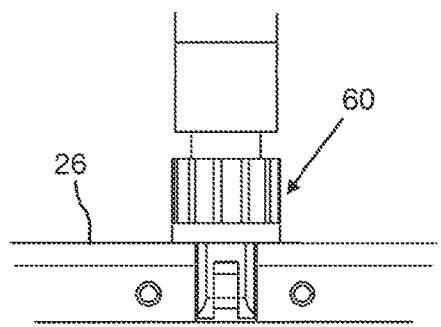
FIG. 12(a) is a detail part view, taken from a bottom central portion of FIG. 11, of the mechanism part of the folding pizza peel of the present invention, shown with the nut in the tightened position.
Figure 12B:
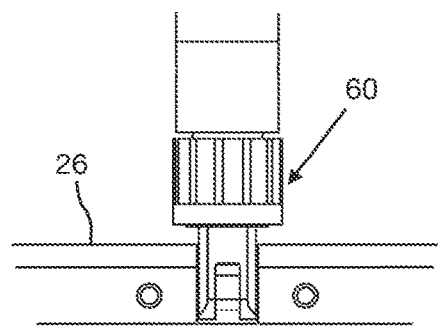
FIG. 12(b) is a detail part view, similar to FIG. 12(a), of the mechanism part of the folding pizza peel of the present invention, shown with the nut in the loosened position.

FIG. 11 illustrates the pizza peel 10 with the handle 30 in storage position. While it is in this position, the handle 30 can be locked in place by rotating and tightening the nut 60 with respect to the blade bent portion 26 in a clockwise direction, as indicated in FIG. 12(a). When the nut 60 presses against the blade bent portion 26, the rotation freedom of the handle 30 is blocked, and the pizza peel 10 can be stored neatly in a compact space or it can be hung from the hanging loop 34, like how the pizza peel 10 is shown in FIG. 11. To loosen the handle 30 and allow it to rotate freely again, the nut 60 can be rotated in anti-clockwise direction as illustrated in FIG. 12(b).

To make the pizza peel 10, the handle 30 preferably is constructed of wood, although other materials with low thermal conductivity, such as titan or nylon, may be used. The blade 20 is preferably constructed of aluminum, or another type of metal, although other materials capable of withstanding oven temperatures may be used. The aluminum surface of the blade 20 may be treated with anodic oxidation finishing to protect it from corrosion and reaction with acidic food.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

What is claimed is:

1. A peel comprising:
   a handle including a screw mounting end and a grip end, the handle defining a handle longitudinal axis that extends from the screw mounting end to the grip end;
   a blade including a blade mounting portion attached to a blade edge, the blade edge defining a substantially planar surface, and the blade edge being configured to support a pizza or other baked good;
   a support bracket coupled to the blade mounting portion;
   a pin coupled to the support bracket;
   a hinge rotatable around the pin, the hinge including:
      a hinge inner thread at a first end of the hinge and along a hinge longitudinal axis, the hinge inner thread selectively coupling with the screw mounting end of the handle; and
      a hinge outer thread along the hinge longitudinal axis; and
   a nut including a nut inner thread which fits to the hinge outer thread,
   wherein the handle is configured to rotate approximately 180 degrees between:
      a deployed position wherein the grip end extends away from the blade edge, and
      a storage position wherein the grip end is adjacent to the blade edge.

2. The peel of claim 1, wherein the handle is lockable in either:
   the deployed position by tightening the nut with respect to the support bracket, or
   the storage position by tightening the nut with respect to a blade bent portion.

3. The peel of claim 1, wherein the blade mounting portion and the blade edge are connected by a blade bent portion such that the blade mounting portion and the blade edge are arranged to lie in different parallel planes.

4. The peel of claim 3, wherein the handle is selectively lockable in:
   the deployed position by tightening the nut with respect to the support bracket, and
   the storage position by tightening the nut with respect to the blade bent portion.

5. The peel of claim 1, wherein the handle is at least partially made of wood.

6. The peel of claim 5, wherein the handle comprises a metal socket with outer threads which constitutes the screw mounting end.

7. The peel of claim 1, wherein the pin defines a pin longitudinal axis parallel to the substantially planar surface of the blade edge and perpendicular to the handle longitudinal axis.

8. The peel of claim 1, wherein the nut further comprises a non-metal cap disposed on a first nut end proximal the blade mounting portion.

9. The pizza peel of claim 1 wherein the nut defines grooves on an outer surface thereof.

10. The pizza peel of claim 1, wherein the blade mounting portion and the blade edge are connected by a bent portion so that the blade mounting portion and the blade edge are arranged to lie in different parallel planes.

11. A peel comprising:
    a handle including a screw mounting end and a grip end, the handle defining a handle longitudinal axis that extends from the screw mounting end to the grip end;
    a blade including a blade mounting portion attached to a blade edge, the blade edge defining a substantially planar surface, wherein the blade mounting portion of the blade and the blade edge are connected by a blade bent portion such that the blade mounting portion of the blade and the blade edge are arranged to lie in different parallel planes, and the blade edge is configured to support a pizza or other baked good;
    a support bracket attached to the blade mounting portion and the blade bent portion;
    a pin defining a pin longitudinal axis parallel to the substantially planar surface of the blade edge and perpendicular to the handle longitudinal axis, the pin being fixed to the support bracket;
    a hinge rotatable around the pin, the hinge including:
       a hinge inner thread at a first end of the hinge and along a hinge longitudinal axis, the hinge inner thread selectively coupling with the screw mounting end of the handle; and
       a hinge outer thread along the hinge longitudinal axis; and
    a nut including an inner thread which fits to the hinge outer thread and an anti-scratching cap disposed on a first nut end proximal the blade mounting portion;
    wherein the handle is configured to rotate approximately 180 degrees between:
       a deployed position wherein the grip end extends away from the blade edge, and
       a storage position wherein the grip end is adjacent to the blade edge, and
    wherein the handle is selectively lockable in:
       the deployed position by tightening the nut with respect to the support bracket, and
       the storage position by tightening the nut with respect to the blade bent portion.

* * * * *